(12) United States Patent
Nakashima

(10) Patent No.: US 6,570,841 B1
(45) Date of Patent: May 27, 2003

(54) DISK CARTRIDGE AND DISK PLAYER

(75) Inventor: Hiroshi Nakashima, Hirakata (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/554,468

(22) PCT Filed: Feb. 12, 1999

(86) PCT No.: PCT/JP99/00631

§ 371 (c)(1),
(2), (4) Date: May 11, 2000

(87) PCT Pub. No.: WO99/41745

PCT Pub. Date: Aug. 19, 1999

(51) Int. Cl.[7] ............................................. G11B 17/04
(52) U.S. Cl. ..................................................... 369/291
(58) Field of Search ................................ 369/291, 77.2, 369/77.5, 75.2, 75.1; 360/99.02, 96.6, 99.06; G11B 23/03, 23/04

(56) References Cited

U.S. PATENT DOCUMENTS 5,530,691 A * 6/1996 Fujisawa ..................... 369/291
5,577,014 A * 11/1996 Kawamura .................. 369/77.2
6,002,660 A * 12/1999 Ikegame ..................... 369/77.2

* cited by examiner

Primary Examiner—William Korzuch
Assistant Examiner—Christopher R. Beacham
(74) Attorney, Agent, or Firm—Hogan & Hartson, LLP

(57) ABSTRACT

The invention provides a disk cartridge according to a new standard by making a minimized modification in the design of a conventional disk cartridge which comprises a cartridge body having an erroneous insertion preventing groove formed in its front end face and having a predetermined depth. The disk cartridge (7) of the new standard comprises a cartridge body (70) identical with the body of the conventional cartridge in external dimensions. The cartridge body (70) is formed with an erroneous insertion preventing groove (71) opened at the same position as the preventing groove of the conventional cartridge and smaller than this groove in depth along the direction A of insertion of the cartridge, and a cartridge identification groove (72) of predetermined depth not existing in the conventional cartridge.

2 Claims, 14 Drawing Sheets

(a)

(b)

(a)

(b)

US 6,570,841 B1

DISK CARTRIDGE AND DISK PLAYER

TECHNICAL FIELD

The present invention relates to disk cartridges containing a signal recording disklike medium such as an optical disk, magnetic disk or optomagnetic disk, and to disk players for recording and/or reproducing signals with use of the disk cartridge.

BACKGROUND ART

Disk cartridges comprising a flat rectangular parallelepipedal cartridge body 90 wherein a disk 91 is encased are used for optical disk players which are adapted to optically record signals on optical disks or optomagnetic disks or similarly reproduce signals from such disks (JP, 05-198121, A) as shown in FIGS. 22, (a) and (b).

The cartridge body 90 is formed with a window 100 for exposing the signal bearing surface of the disk 91, and has a shutter 92 slidably mounted thereon for opening or closing the window 100. Disposed inside the cartridge body 90 is a lock member 93 along an end face 9a extending along the direction of sliding of the shutter 92 for locking the shutter 92 in its closed position. The lock member 93 is elastically shiftable about a base end thereof and has a forward end formed with an engaging recessed portion 95. The forward end of the lock member 93 further has a slope 99 which functions for unlocking as will be described later.

On the other hand, the portion of the shutter 92 slidable along the end face 9a of the cartridge body 90 is provided with a lug 96 engageable with the recessed portion 95 of the lock member 93. The shutter 92 also has a spring retainer 98, with a torsion spring 94 provided between the retainer 98 and the cartridge body 90 for biasing the shutter 92 in the closing direction. Usually with the disk cartridge 9, the recessed portion 95 of the lock member 93 and the lug 96 of the shutter 92 engage with each other to lock the shutter 92 in the closed position.

The disk cartridge 9 is inserted into an optical disk player toward an inner portion thereof from a cartridge inlet formed in its cabinet. With the advance of the cartridge 9 as indicated by an arrow A in FIG. 22, (a), an unlocking piece 97 provided in the inner portion of the device moves in a direction opposite to the arrow A relative to the cartridge and enters the cartridge body 90 to come into sliding contact with the lock member 93, elastically shifting the lock member 93. As a result, the recessed portion 95 of the lock member 93 is released from the lug 96 of the shutter 95 to unlock the shutter 92.

In the course of a further advance of the cartridge 9 toward a recording-reproduction position in an inward portion of the device, the unlocking piece 97 pushes the shutter 92 open against the elasticity of the torsion spring 94 as shown in the drawing, (b). Signals are recorded or reproduced in this state through window 100 of the cartridge body 90.

The unlocking piece 97 thereafter moves in the direction of arrow A relative to the cartridge 9 which is moved backward upon ejection, permitting the movement of the shutter 92 in the closing direction. The shutter 92 is therefore closed as shown in FIG. 22, (a) by being biased by the torsion spring 94. In the course of closing of the shutter 92, the unlocking piece 87 moves in sliding contact with the slope 99 of the lock member 93, elastically shifting the lock member 93 in an unlocking direction. Consequently in the closed position of the shutter 92 shown in FIG. 22, (a), the recessed portion 95 of the lock member 93 and the lug 96 of the shutter 92 are opposed to each other in an unengaged state.

When the cartridge 9 is drawn out from the cartridge inlet with a further backward movement, this movement releases the locking member 93 from the unlocking piece 97, with the result that the lock member 93 elastically restores itself, engaging the recessed portion of the lock member 93 with the lug 96 of the shutter 92 to lock the shutter 92 in its closed position.

With disk cartridges such as the one described above, the density with which signals are recorded on the disk becomes ever higher, and disk cartridges according to new standards will be developed one after another with this trend for use with signal recording systems which are different from the conventional system. When two kinds of disk cartridges of different standards are to be provided commercially, it is economically and functionally desirable that the cartridges be in common in external dimensions to permit the use of a common disk player for signal recording or reproduction. It is also likely that a disk player will be made commercially available for exclusive use with disk cartridges of each standard. The disk player thus adapted for exclusive use needs to be so designed as to prevent insertion of disk cartridges of different standard.

However, problems are encountered in modifying a disk cartridge of conventional standard for additional use as a disk cartridge according to a new standard, since the conventional disk cartridge thus modified can not be used on the conventional disk player for recording or playback. Problems are also encountered in designing a disk cartridge of new standard as greatly altered from the conventional standard not only because there arises a need to re-design the die and production equipment necessary for the fabrication of the new disk cartridge and also because the cartridge of new design makes the disk player complex in construction.

An object of the present invention is to provide disk cartridge of two standards, i.e., a cartridge of conventional standard which is not modified in any way, and a disk cartridge of new standard which is available by making a minimized modification in the design of the disk cartridge of conventional standard.

Another object of the present invention is to provide disk players for exclusive use with the respective disk cartridges of two standards, and a disk player which is usable for the disk cartridges of two standards in common for recording or playback.

DISCLOSURE OF THE INVENTION

While a first disk cartridge 2 has a conventional standard, the present invention provides a second disk cartridge 7 having a new standard and different from the cartridge 2 in signal recording system.

The second disk cartridge 7 comprises a cartridge body 70 which is identical with the body 20 of the first disk cartridge 2 in external dimensions. The body 20 of the first disk cartridge 2 has an erroneous insertion preventing groove 25 formed in a front end face 2a thereof orthogonal to the direction A of insertion into a disk player and having a predetermined depth along the insertion direction, while the cartridge body 70 of the second disk cartridge 7 has an erroneous insertion preventing groove 71 opened at the same position as the preventing groove 25 of the first disk cartridge 2 and smaller than the preventing groove 25 in depth along the cartridge insertion direction A. The cartridge body

70 further has a cartridge identification groove 72 of predetermined depth not existing in the cartridge body 20 of the first disk cartridge 2.

While a conventional disk player (first disk player) is used exclusively for recording on or playing back of the first disk cartridge 2, the invention provides a new disk player (second disk player) for exclusive use with the second disk cartridge 7 for recording or playback.

While a cartridge holder 4 of the first disk player is formed with a lug 46 projecting from a side wall 48 thereof toward a cartridge accommodating chamber, a cartridge holder 8 of the second disk player is formed with a lug 81 projecting from a side wall 48 thereof toward a cartridge accommodating chamber and positioned at the same level as the lug 46 of the first disk player and rearwardly of the lug 46 along the direction A of insertion of the cartridge. The cartridge holder 8 of the second disk player is formed on a bottom wall 40 thereof with a protrusion 82 not existing in the cartridge holder 4 of the first disk player.

The present invention further provides a new disk player (common disk player) for use with both the first disk cartridge 2 and the second disk cartridge 7 different from the disk cartridge 2 in signal recording system for signal recording and/or reproduction.

The disk player comprises a cartridge holder 85 for the disk cartridge to be inserted in, the cartridge holder 85 having a lug 81 projecting from a side wall 48 thereof and positioned in corresponding relation with the depth of the preventing groove 71 of the second disk cartridge 7 to advance into the groove 71, the cartridge holder 85 having a bottom wall 40 free from any obstacle against the insertion of both the disk cartridges 2, 7.

When the first disk cartridge 2 as postured properly is inserted into the cartridge holder 4 of the first disk player, the lug 46 of the holder 4 advances into the erroneous insertion preventing groove 25 of the cartridge 2, permitting the insertion of the cartridge 2. If the disk cartridge 2 as postured erroneously is to be inserted, the lug 46 of the holder 4 comes into contact with an end face of the cartridge 2, preventing the insertion of the cartridge 2.

Further when the second disk cartridge 7 is to be inserted into the cartridge holder 4 of the first disk player, the cartridge 7 is blocked in the course of insertion since the erroneous insertion preventing groove 71 of the cartridge 7 has a smaller depth than the preventing groove 25 of the first disk cartridge 7.

When the second disk cartridge 7 as postured properly is inserted into the cartridge holder 8 of the second disk player, the lug 81 of the holder 8 advances into the erroneous insertion preventing groove 71 of the cartridge 7, with the protrusion 82 of the holder 8 entering the cartridge identification groove 72 of the cartridge 7, permitting the insertion of the cartridge 7. If the disk cartridge 7 as postured erroneously is to be inserted, the lug 81 of the holder 8 comes into contact with an end face of the cartridge 7, preventing the insertion of the cartridge 7.

Further if the first disk cartridge 2 is to be inserted into the cartridge holder 8 of the second disk player, the protrusion 82 on the holder 8 comes into contact with the end face of the cartridge 2, preventing insertion of the cartridge 2 since the identification groove 72 is not formed in the cartridge 2.

On the other hand, when the first disk cartridge 2 as postured properly is inserted into the common disk player, the lug 81 of the cartridge holder 85 advances into the erroneous insertion preventing groove 25 of the cartridge 2. The cartridge 2 is inserted to the innermost portion of the holder 85 since the bottom wall 40 of the holder 85 is free from any obstacle against the insertion of the first disk cartridge 2.

When the second disk cartridge 7 as postured properly is inserted into the common disk player, the lug 81 of the holder 85 advances into the erroneous insertion preventing groove 71 of the cartridge 7, permitting the insertion of the cartridge 7.

The cartridge holder 85 of the common disk player has an on-off switch 86 provided on the bottom wall 40 and positionable in the cartridge identification groove 72 formed in the body 70 of the second disk cartridge 7, whereby the disk cartridge accommodated in the cartridge holder 85 can be identified.

When the first disk cartridge 2 is inserted into the common disk player, the bottom wall of the cartridge 2 presses the on-off switch 86 of the holder 85 to turn on the switch, while when the second disk cartridge 7 is inserted, the switch 86 is positioned in the cartridge identification groove 72 of the cartridge 7, holding the switch on. Accordingly, the disk cartridge inserted can be identified from the on or off state of the switch 86.

The present invention makes it possible to provide two disk cartridges of different standards, i.e., the first disk cartridge 2 according to a conventional standard and having no modification made therein, and the second disk cartridge 7 of a new standard which is made available by slightly modifying the conventional cartridge in design, i.e., merely by forming an erroneous insertion preventing groove of smaller depth than conventionally and additionally forming a cartridge identification groove 72.

The invention further provides two disk players of different standards, i.e., the first disk player according to a conventional standard and having no modification made therein, and the second disk player of a new standard which is made available by slightly modifying the conventional player in design, i.e., merely by slightly shifting the lug to be advanced into the erroneous insertion preventing groove of the disk cartridge and additionally forming a protrusion positionable in the cartridge identification groove.

Furthermore, the invention provides a common disk player for use with both the disk cartridges of different standards by modifying the second disk player in design, i.e., merely by eliminating the additional protrusion.

BEST MODE OF CARRYING OUT THE INVENTION

A detailed description will be given below of embodiments of the invention with reference to FIGS. 1 to 21. In these drawings, the direction in which the disk cartridge is inserted into the disk player is indicated always by an arrow A.

First Embodiment

Figure 1:
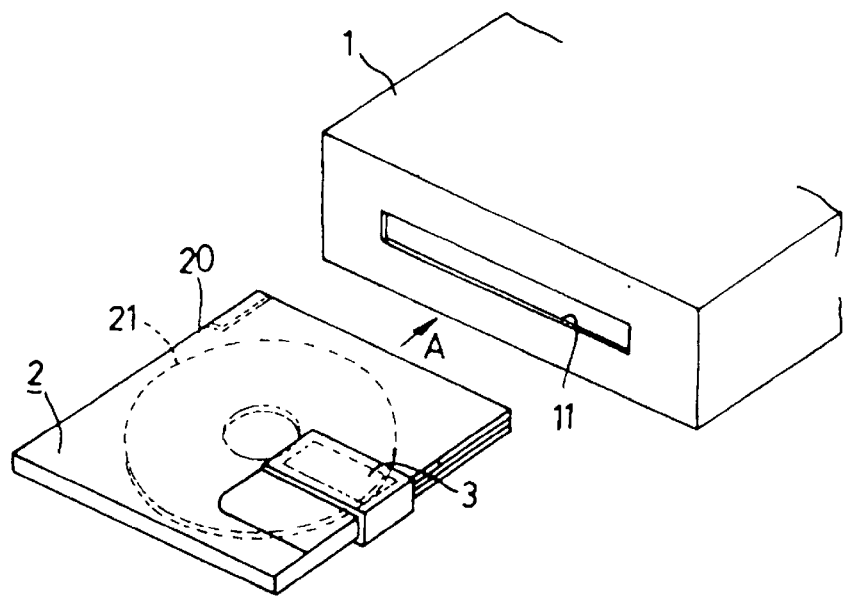
FIG. 1 is a perspective view showing a disk cartridge and part of a disk player for recording or playback with use of the disk cartridge.

Referring to FIG. 1, the invention provides a disk cartridge 2 comprising a flat rectangular parallelepipedal cartridge body 20 of resin rotatably enclosing a disk 21 therein. Signals can be recorded on and reproduced from the disk when the cartridge 2 is inserted into a disk player through a cartridge inlet 11 formed in the cabinet 1 of the player.

Figure 2:
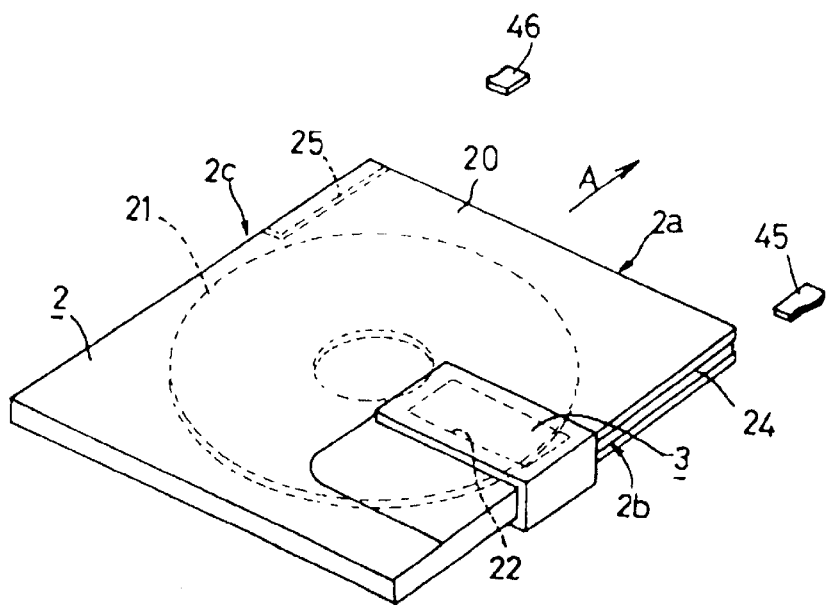
FIG. 2 is a perspective view of the disk cartridge for use in a first embodiment.

As shown in FIG. 2, the body 20 of the cartridge 2 is formed with a window 22 for exposing the signal bearing surface of the disk 21, and has a shutter 3 mounted thereon and slidable along one end face of the body 20 for opening or closing the window 22. The cartridge body 20 is formed with a window 29 shown in FIG. 5, (b) in the wall thereof opposite to the window 22, and the windows 22, 29 are used for signal recording and reproduction.

An unlocking piece inserting groove 24 is formed along an end face 2b of the cartridge body 20 which is at the right side thereof when the disk is seen toward the direction A of insertion of the disk. An erroneous insertion preventing groove 25 is formed in the left end face 2c of the body. These grooves 24, 25 are opened in the front end face 2a of the body 20 and extend from the openings toward the direction of sliding of the shutter 3.

On the other hand, the cabinet 1 is provided, as positioned inwardly of the inlet 11, with an unlocking piece 45 for unlocking the shutter 3 and a lug 46 for preventing the insertion of the cartridge 2 as postured erroneously. When the cartridge 2 is inserted as postured properly into the cabinet 1, the unlocking piece 45 advances into the inserting groove 24, and the lug 46 into the preventing groove 25.

Figure 3:
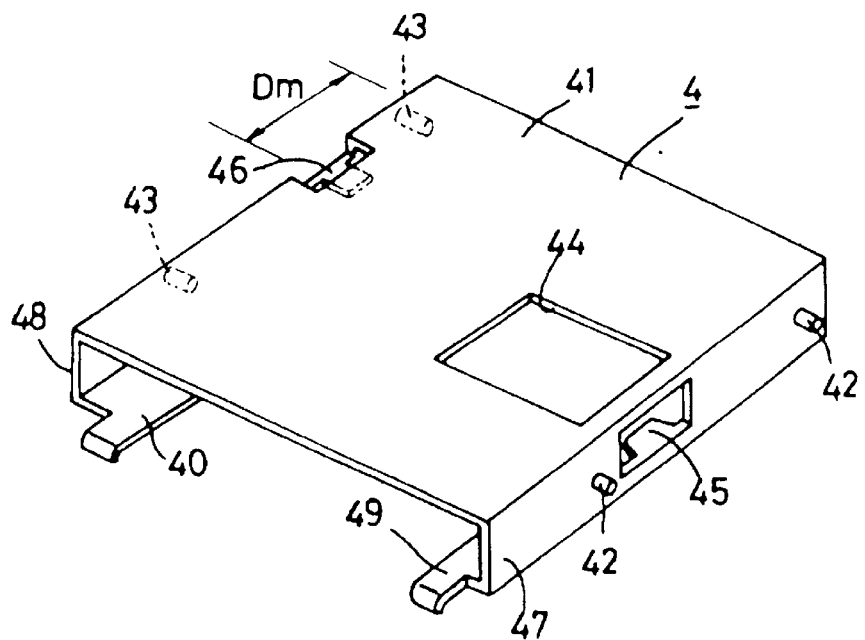
FIG. 3 is a perspective view of a cartridge holder for use in the first embodiment.
Figure 4:
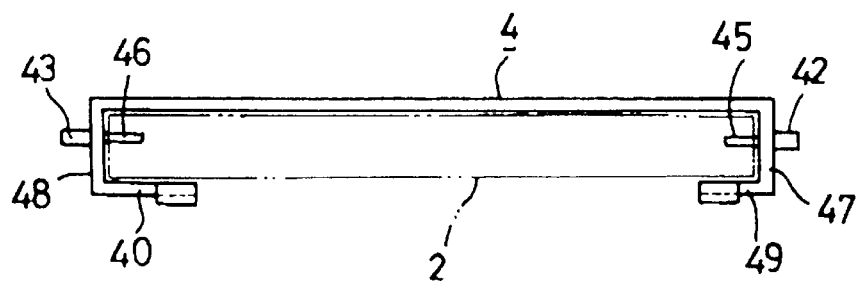
FIG. 4 is a front view of the cartridge holder.

Disposed in the cabinet 1 inwardly of the cartridge inlet 11 is a cartridge holder 4 shown in FIGS. 3 and 4. The cartridge 2 as loaded into the holder 4 can be moved to a predetermined recording-reproduction position.

The cartridge holder 4 has a left side wall 48 and right side wall 47 at opposite ends of a top wall 41. Projecting inward in parallel to the top wall 41 are a left bottom wall 40 at the lower end of the left side wall 48 and a right bottom wall 49 at the lower end of the right side wall 47. Thus, the disk cartridge 2 can be accommodated and held in the holder 4. An opening 44 for signal recording or reproduction is formed in the top wall 41 of the holder 4 and positioned so as to be opposed to the window 22 of the cartridge 2.

Projecting outward from the side walls 47, 48 of the holder 4 are pins 42, 42, 43, 43, four in total number, for use in moving the holder 4. The mechanism for driving the cartridge holder 4 is well-known and therefore will not be illustrated or described. The unlocking piece 45 extends inward from the right side wall 47 of the holder 4, with the lug 46 projecting inward from the left side wall 48.

Figure 5:
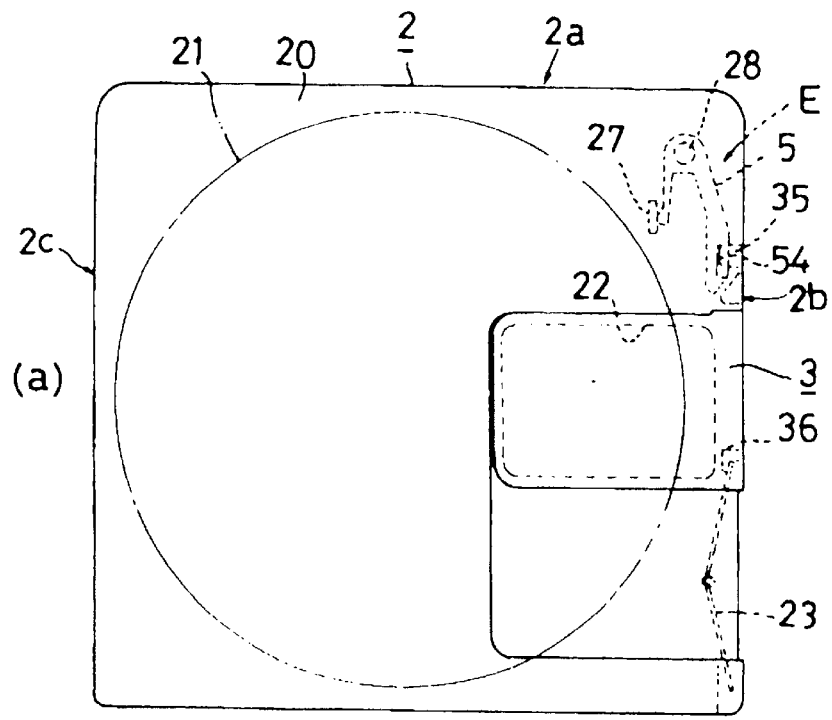
FIG. 5 includes a plan view (a) and rear view (b) of the disk cartridge.
Figure 5:
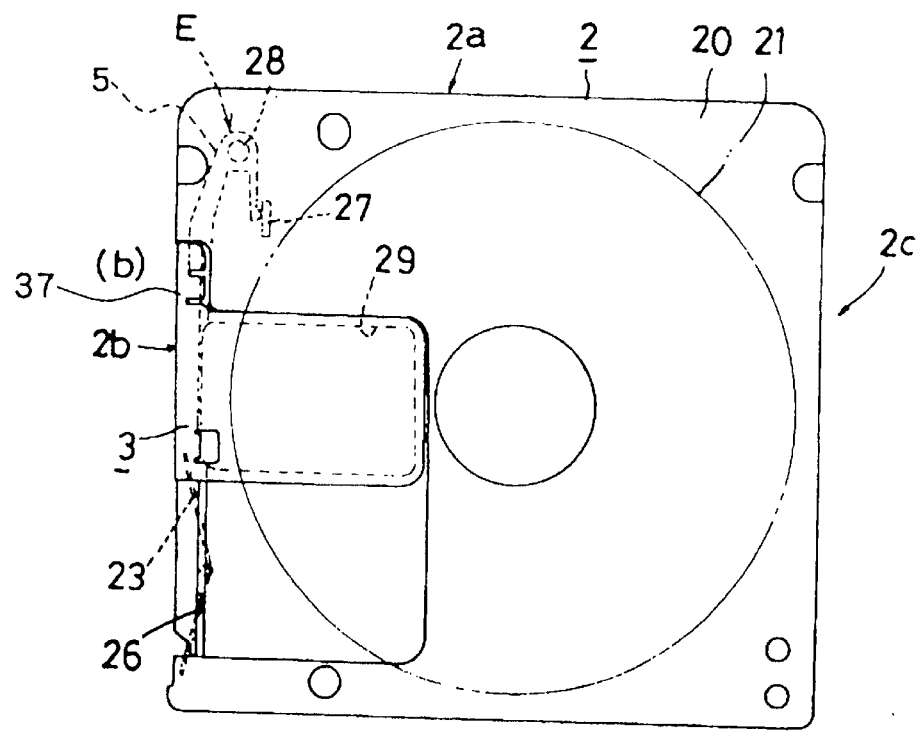

With reference to FIGS. 5, (a) and (b), of the four corners of the body 20 of the cartridge 2, the corner formed by the intersection of the front end face 2a of the body 20 with the right end face 2b thereof has an inside space E, in which a lock member 5 is disposed for locking the shutter 3 in a closed position. Also disposed inside the cartridge body 20 is a torsion spring 23 for biasing the shutter 3 toward the closing direction. The torsion spring 23 has one end engaged with a spring retainer 36, and the other end engaged with a corner portion of the body 20.

Figure 6:
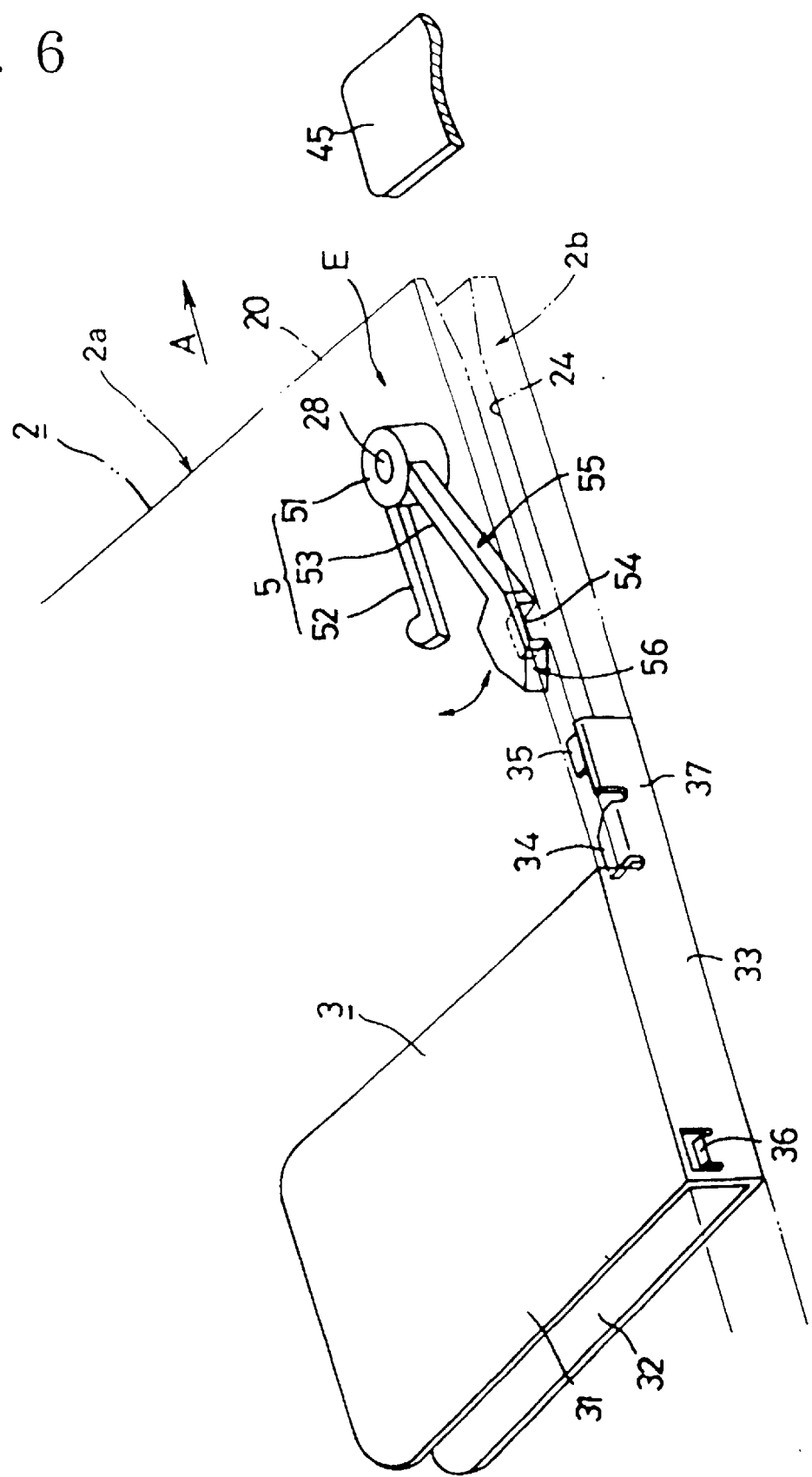
FIG. 6 is a fragmentary enlarged perspective view of the disk cartridge.

With reference to FIG. 6, the shutter 3 comprises a pair of closing plates 31, 32 for closing the pair of windows 22, 29 formed in the cartridge body 20, and a connecting portion 33 interconnecting the closing plates 31, 31 each at one end thereof. The connecting portion 33 is formed with the spring retainer 36 and integral with an arm piece 37 projecting toward the inside space E. Projecting from the arm piece 37 inwardly of the cartridge body 20 are a slide piece 34 slidably in engagement with the right end face 2b of the cartridge 2, and the engaging piece 35.

As seen in FIG. 5, (b), the arm piece 37 is also slidably engaged in a shutter guide groove 26 formed in the rear surface of the cartridge body 20, whereby the shutter 3 is made slidable forward or rearward along the right end face 2b of the cartridge body 20.

With reference to FIG. 6, the lock member 5 comprises a boss 51 rotatably fitting around a pivot 28 on the cartridge body 20, a slightly thin elastic piece 52 projecting from the boss 51 approximately in parallel to the plane of the disk, and a slightly thick rock piece 53 projecting from the boss 51 approximately in parallel to the plane of the disk. The lock piece 53 extends toward the unlocking piece inserting groove 24. With the elastic deformation of the elastic piece 52, the lock piece 53 can elastically shift in a plane parallel to the plane of disk.

The lock piece 53 of the lock member 5 has a first slope 55 positioned toward the base end thereof, and a second slope 56 toward the forward end thereof, the slopes facing toward the right end face 2b of the cartridge body 20. Formed between the first slope 55 and the second slope 56 is an engaging recessed portion 54 in which the engaging piece 35 is engageable. The first and second slopes 55, 56 each have an end portion adjacent to the recessed portion 54 and positioned in the unlocking piece inserting groove 24. The unlocking piece 45 comes into contact with the first slope 55 with the reciprocating movement of the disk cartridge 2, i.e., during the advance of the cartridge 2, while the piece 45 comes into contact with the second slope 56 during the backward movement of the cartridge 2 as will be described later.

The forward end of the elastic piece 52 of the lock member 5 bears on a stopper 27 provided on the cartridge body 20 as seen in FIGS. 5, (a) and (b), whereby the lock member 5 is prevented from rotating clockwise.

Figure 7:
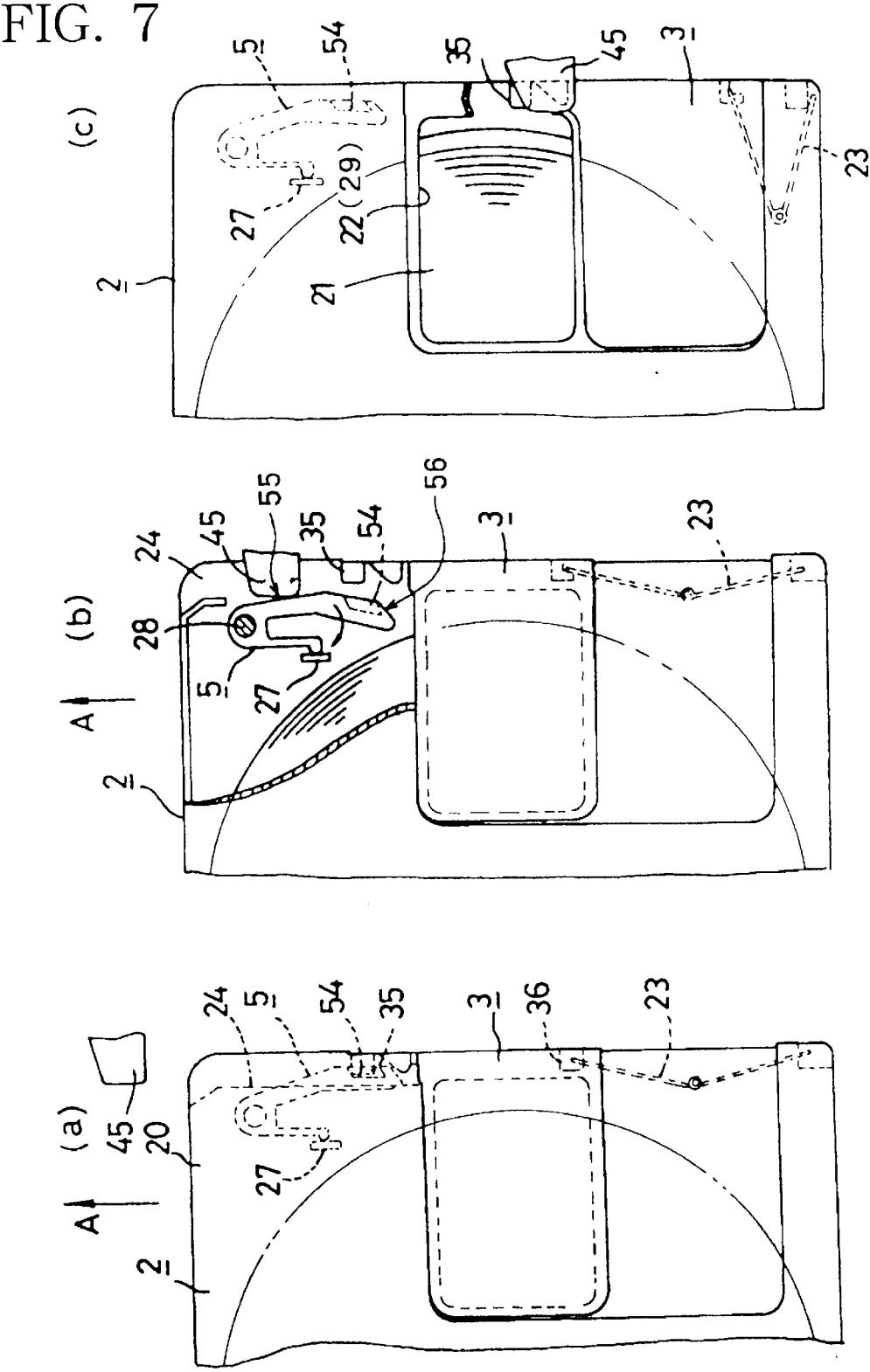
FIG. 7 includes plan views partly broken away and showing the operation of the disk cartridge.

The unlocking movement of the lock member 5 and the opening movement of the shutter 3 with the advance of the disk cartridge 2 are shown in FIGS. 7, (a), (b) and (c). FIG. 7, (a) shows the disk cartridge 2 before being inserted into the cabinet 1. The recessed portion 54 of the lock member 5 and the engaging piece 35 of the shutter 3 are in engagement with each other, locking the shutter 3 in its closed position.

When the disk cartridge 2 in this state is inserted into the cabinet 1 inwardly thereof from the inlet 11, the unlocking piece 45 moves in a direction opposite to the arrow A relative to the cartridge with the advance thereof as shown in FIG. 7, (b). The unlocking piece 45 moves into the inserting groove 24 of the cartridge 2 and comes into contact with the first slope 55 of the lock member 5, A further advance of the cartridge 2 causes the unlocking piece 45 to press the first slope 55, elastically shifting the lock member 5 as indicated by an arrow. This moves the recessed portion 54 of the lock member 5 out of engagement with the engaging piece 35 of the shutter 3 to unlock the shutter 3.

The cartridge 2 is thereafter further advanced, bringing the unlocking piece 45 into contact with an end portion of the shutter 3. The shutter 3 is pushed open against the elasticity of the torsion spring 23 with a further advance of the cartridge 2. The cartridge 2 in this state is chucked at the signal recording-reproduction position, and signals are recorded on the disk 21 or reproduced from the disk 21 through the windows 22, 29.

When the disk cartridge 2 is ejected, the unlocking piece 45 moves in the direction of arrow A relative to the cartridge 2 with the backward movement thereof, permitting the shutter 3 to move in the closing direction. Accordingly, the shutter 3 is closed by being biased by the torsion spring 23 as shown in FIG. 7, (b). In the course of closing of the shutter 3, the unlocking piece 45 moves in sliding contact with the second slope 56 of the lock member 5, elastically shifting the lock member 5 toward the direction of an arrow in FIG. 7, (b), As a result, the recessed portion 54 of the lock member 5 and the engaging piece 35 of the shutter 3 are opposed to each other in an unengaged state.

The disk cartridge 2 is further moved backward and pulled out of the cartridge inlet, whereby the unlocking piece 45 is released from the lock member 5. Consequently, the lock member 5 elastically restores itself, bringing the recessed portion 54 of the lock member 5 into engagement with the engaging piece 35 of the shutter 3 to lock the shutter 3 in the closed position.

According to the present embodiment described above, the lock member 5 is accommodated in the inside space E in a corner of the cartridge body 20 where a sufficient space is available for the arrangement of members, the forward end of the lock member 5 to be engaged with the engaging piece 35 of the shutter 3 is also accommodated in the inside space E, and the lock member 5 is engaged with or disengaged from the engaging piece 35 of the shutter 3 similarly in the inside space E. The distance between the end face 2b of the cartridge body 20 and the outer periphery of the disk 2 therefore poses no problem in compacting the cartridge body 20.

It is accordingly possible to make the cartridge body 20 smaller than conventionally by reducing the distance between the end face 2b of the cartridge body 20 and the outer periphery of the disk 21 to the smallest possible value approximate to zero.

Second Embodiment

Figure 8:
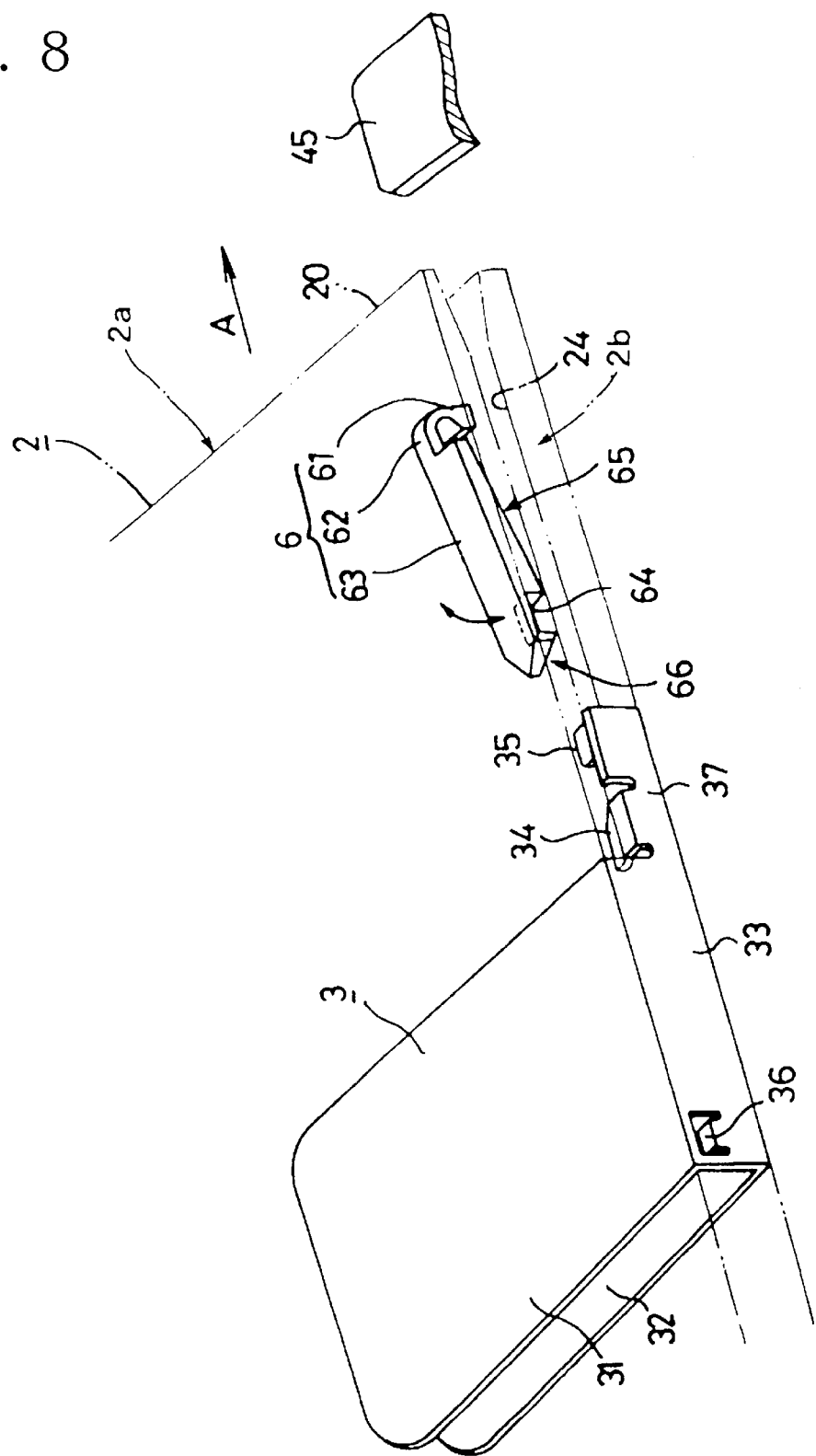
FIG. 8 is an enlarged fragmentary perspective view of a disk cartridge of second embodiment.
Figure 9:
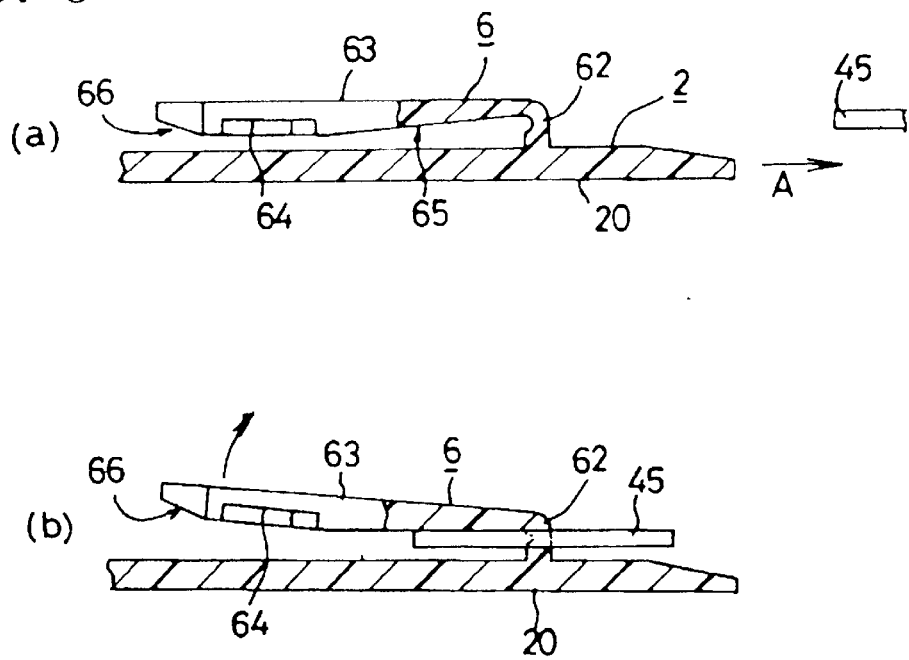
FIG. 9 includes side elevations partly broken away and showing the operation of a lock member of the disk cartridge.

This embodiment has exactly the same construction as the first embodiment except that a lock member 6 molded integrally with the cartridge body 20 is provided in place of the lock member 5 of the first embodiment as seen in FIGS. 8 and 9. Accordingly, only the construction and operation of the lock member 6 will be described, and other components will not be illustrated or described. Through out FIGS. 1 to 9, like parts are designated by like reference numerals.

As shown in FIG. 8, the lock member 6 comprises a support portion 61 extending vertically from the cartridge body 20, an elastic portion 62 formed at the upper end of the support portion 61 and curved in a plane orthogonal to the disk surface, and a lock portion 63 extending from the elastic portion 62 along the disk surface. The lock portion 63 elastically shifts in directions orthogonal to the disk surface as indicated by arrows by virtue of the elastic deformation of the elastic portion 62.

The lock portion 63 of the lock member 6 has a first slope 65 positioned toward the base end thereof, and a second slope 66 toward the forward end thereof, the slopes facing toward the bottom of the cartridge body 20. Formed between the first slope 65 and the second slope 66 is an engaging recessed portion 64 in which the engaging piece 35 is engageable. The first and second slopes 65, 66 each have an end portion adjacent to the recessed portion 64 and positioned in the unlocking piece inserting groove 24. The unlocking piece 45 comes into sliding contact with the first slope 65 and the second slope 66 with the reciprocating movement of the disk cartridge 2 to effect engagement and disengagement between the recessed portion 64 of the lock member 6 and the engaging piece 35 of the shutter 3.

For example as shown in FIG. 9, (a), the disk cartridge 2 advances in the direction of arrow A, whereby the unlocking piece 45 is first brought into contact with the first slope 65 of the lock member 6. A further advance of the cartridge 2 causes the unlocking piece 45 to push up the lock portion 63 of the lock member 6, moving the recessed portion 64 to an unlocking position as shown in the same drawing, (b).

When the disk cartridge 2 is ejected, the unlocking piece 45 comes into contact with the second slope 66 of the lock member 6, moving the lock portion 63 to the unlocking position.

The present embodiment, wherein the lock member 6 is molded integrally with the cartridge body 20, is smaller in the number of components than the first embodiment and can be produced at a lower cost. Since the direction in which the lock portion 63 of the lock member 6 elastically shifts is orthogonal to the corresponding direction in the first embodiment, i.e., orthogonal to the disk surface, the amount of elastic shift required for disengaging the recessed portion 64 of the lock member 6 from the engaging piece 35 of the shutter 3 needs only to be slightly greater than the thickness of the engaging piece 35, and can therefore be much smaller than the amount of elastic shift required in the first embodiment, i.e., the depth of engagement of the engaging piece 35 in the recessed portion 64.

Because the lock member 6 is molded integrally with the cartridge body 20, the lock member 6 is made from the same resin material as the body 20, whereas since the shutter can be locked and unlocked by slight deformation of the lock portion 63 as stated above, no problem is encountered in making the cartridge body 20 and the lock member 6 from a relatively rigid resin which is required for the shape retentivity of the cartridge body 20.

Third Embodiment

This embodiment relates to a disk cartridge (hereinafter referred to as the "second disk cartridge") of new standard which has the same external dimensions as the disk cartridge (hereinafter referred to as the "first disk cartridge") according to the first embodiment described but is different from the first in recording-reproduction system, a disk player (hereinafter referred to as the "second disk player") for exclusive use in recording on or playing back the second disk cartridge, as distinguished from the disk player (hereinafter referred to as the "first disk player") described with reference to the first embodiment, and a disk player (hereinafter referred to as the "common disk player") for use with the first and second disk cartridges in common for recording or playback. Throughout FIGS. 1 to 15, like parts are designated by like reference numerals.

According to the present embodiment, the relationship between the disk player and the disk cartridge must fulfill the following requirements.

(1) The first disk cartridge can be inserted into the first disk player, but the second disk cartridge is not insertable thereinto.

(2) The second disk cartridge can be inserted into the second disk player, but the first disk cartridge is not insertable thereinto.

(3) Both the first and second disk cartridges can be inserted into the common disk player.

Figure 10:
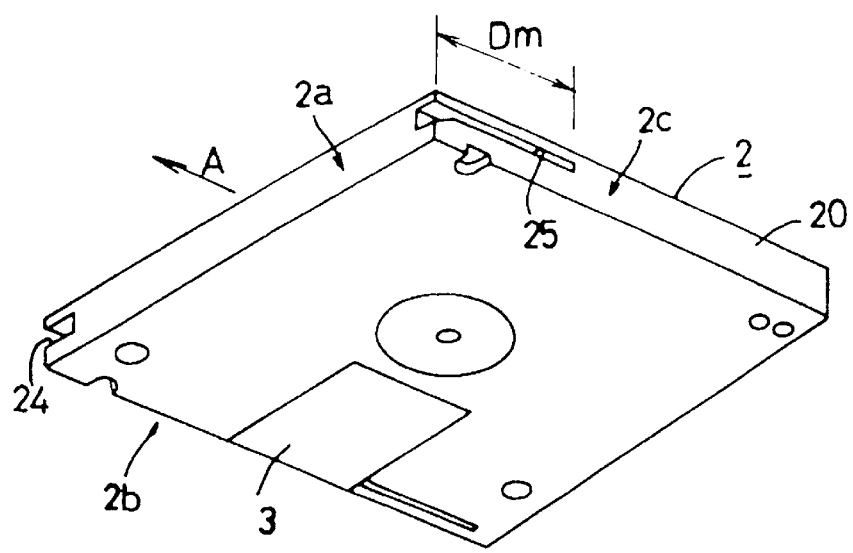
FIG. 10 is a perspective view of the first disk cartridge for use in the first embodiment.

With reference to FIG. 10, the first disk cartridge 2 has the erroneous insertion preventing groove 25 formed in the front end face 2a of the cartridge body 20 and positioned slightly closer to its upper surface, the groove 25 extending along the right end face 2b and having a predetermined depth Dm, so that if the cartridge 2 is to be inserted as positioned to face toward a wrong direction into the holder, the lug 46 will come into contact with the front end face 2a, preventing erroneous insertion of the cartridge 2. Since the unlocking piece inserting groove 24 formed in the front end face 2a of the cartridge body 20 is positioned also slightly closer to the upper surface, the lug 46 will not enter the groove 24, obviating the likelihood of erroneous insertion.

Figure 11:
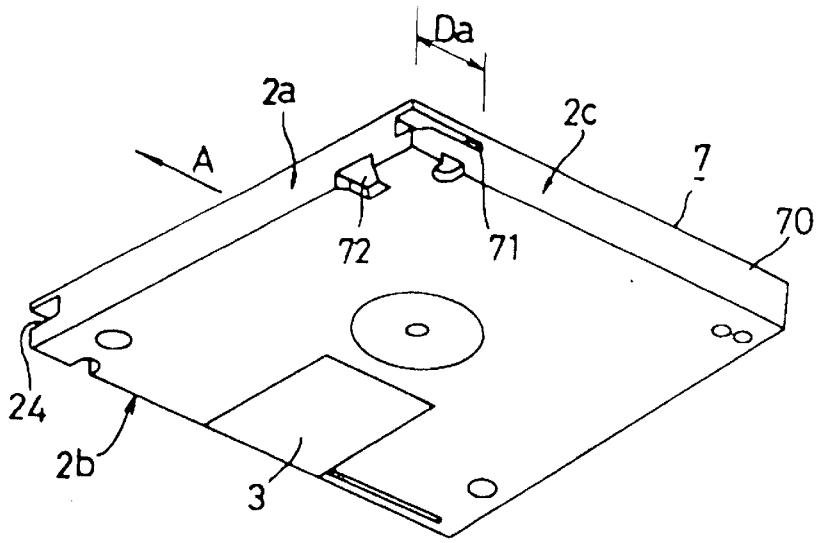
FIG. 11 is a perspective view of a second disk cartridge for use in a third embodiment.

With the first disk cartridge 2 serving as a premise, the second disk cartridge, the second disk player and the common disk player are each have the construction to be described below. With reference to FIG. 11, the second disk cartridge 7 has an erroneous insertion preventing groove 71 for the lug 46 to be inserted in, the groove 71 having a depth Da smaller than the depth Dm of the erroneous insertion preventing groove 25 shown in FIG. 10. Further formed in the bottom wall of the body 70 of the cartridge 7 is a cartridge identification groove 72 having an opening in the front end face 2a thereof and a specified depth and extending in a direction opposite to the arrow A.

Figure 12:
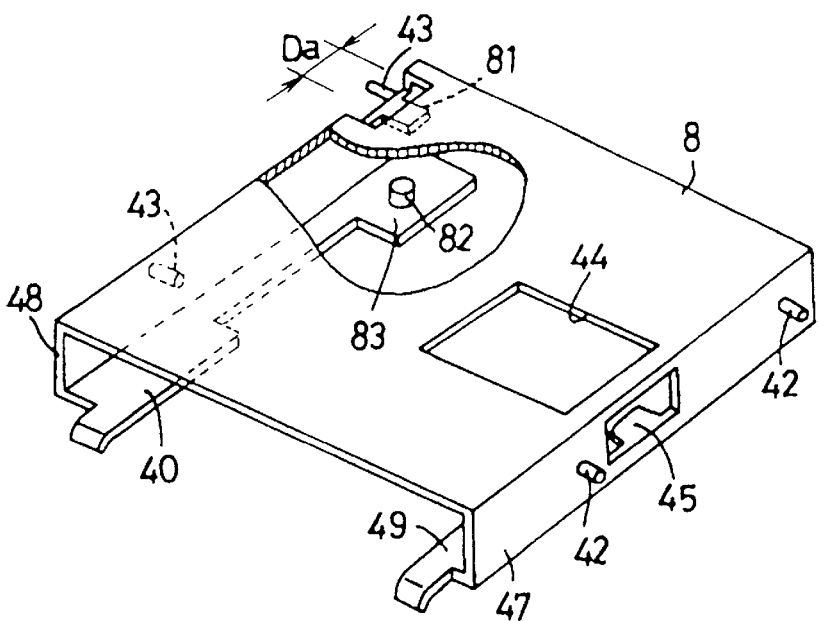
FIG. 12 is a perspective view partly broken away of a cartridge holder of a second disk player for use in the third embodiment.

On the other hand, FIG. 12 shows a cartridge holder 8 used in the second disk player. The left side wall 48 of the holder 8 has an inward lug 81 which is positioned in corresponding relation with the depth Da of the preventing groove 25 and which is to enter the preventing groove 25. Accordingly, the lug 81 is positioned closer to the rear of the player than the lug 46 of the holder 4 of the first disk player shown in FIG. 3.

If it is attempted to insert the second disk cartridge 7 into the holder 4 of the first disk player, the lug 46 of the holder 4 comes into contact with the inner end of the preventing grooved portion 71 of the second disk cartridge 7 in the course of insertion, preventing further insertion, since the preventing groove 71 of the second cartridge 7 is shorter than the preventing groove 25 of the first disk cartridge 2 (Da<Dm). Thus, the foregoing requirement (1) is fulfilled.

Figure 13:
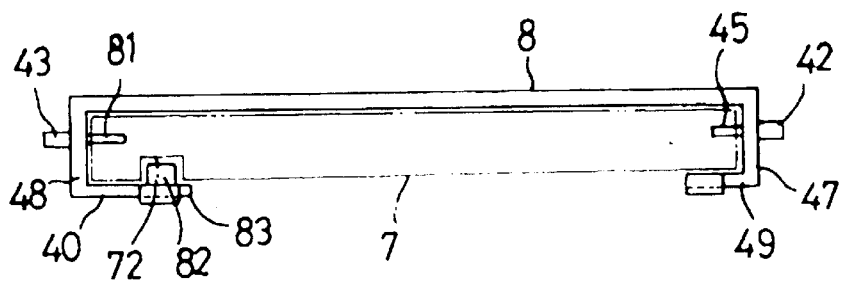
FIG. 13 is a front view of the cartridge holder.

When the second disk cartridge 7 is inserted into the holder 8 of the second disk player as shown in FIG. 13, the lug 81 of the holder 8 advances into the preventing groove 71 of the cartridge 7, with a protrusion 82 on the holder 8 brought into the identification groove 72 of the cartridge 7, whereby the cartridge 7 is loaded in the holder 8.

If it is attempted to insert the first disk cartridge 2 into the holder 8 of the second disk player, on the other hand, the protrusion 82 on the holder 8 comes into contact with the front end face 2a of the first disk cartridge 2, preventing the insertion of the first cartridge 2 since the cartridge identification groove 72 is not formed in the first cartridge 2. Thus, the requirement (2) is fulfilled.

Figure 14:
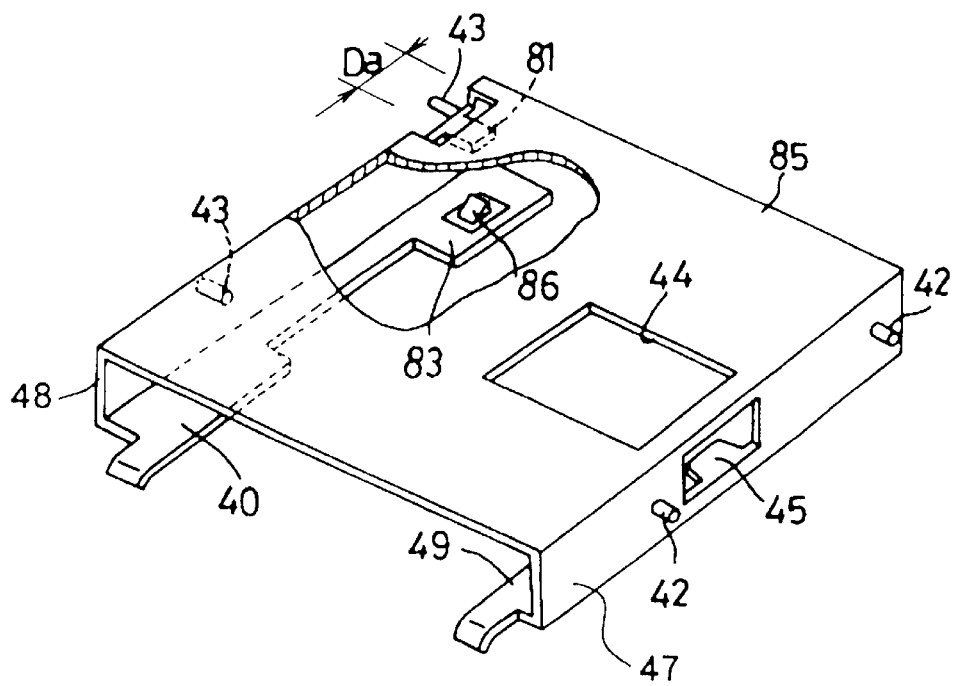
FIG. 14 is a perspective view partly broken away of a cartridge holder of a common disk player for use in the third embodiment.
Figure 15:
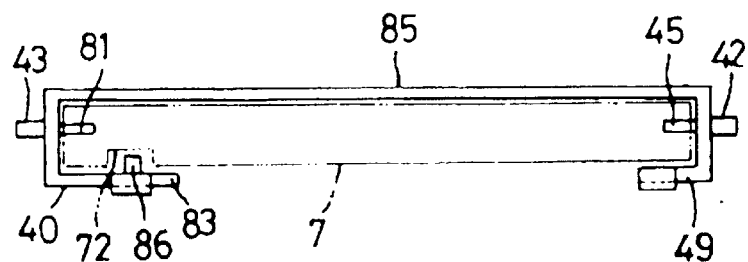
FIG. 15 is a front view of the cartridge holder.

With reference to FIG. 14, the common disk player has a cartridge holder 85, an rearward portion 83 of the left side wall 40 of which is provided with an on-off switch 86 at the same position as the protrusion 82 in the second disk player described. The holder 85 also has a lug 81 at the same position as in the second disk player.

When the first disk cartridge 2 is inserted into the holder 85, the lug 81 of the holder 85 advances into the erroneous insertion preventing groove 25 of the first cartridge 2, and the bottom wall of the cartridge 2 pushes down the on-off switch 86 below the surface of the left side wall 40, allowing the insertion of the first cartridge 2. The depression of the on-off switch 86 from an off state (projecting state) to an on state provides a signal detecting the first disk cartridge 2.

In the case where the second disk cartridge 7 is inserted into the holder 85, the lug 81 of the holder 85 advances into the preventing groove 71 of the second cartridge 7, and the on-off switch 86 is accommodated in the cartridge identification groove 72 of the second cartridge 7, permitting the insertion of the cartridge 7. With the switch 86 held off at this time, this makes it possible to detect the second cartridge 7 as loaded in place. Thus, the foregoing requirement (3) is fulfilled.

The on-off switch 86 can be dispensed with when the disk cartridges are identified by other method, for example, by distinguishing between the preventing grooves 25 and 71 by the difference in depth or by distinguishing between the two disks by the difference in signal recording format.

For use with the first disk cartridge and the second disk cartridge of different standards which are identical in external dimensions but different in recording-reproduction system, the present embodiment provides the first disk player which is usable only for the first cartridge for recording or playback, the second disk player which is usable only for the second cartridge for recording or playback, and the common disk player adapted for use with both the two cartridges for recording or playback, by utilizing simple structural difference.

Fourth Embodiment

This embodiment is another embodiment of the combination of first and second disk cartridges described with reference to the third embodiment, and has an erroneous insertion preventing groove formed in the bottom wall of a cartridge.

Figure 16:
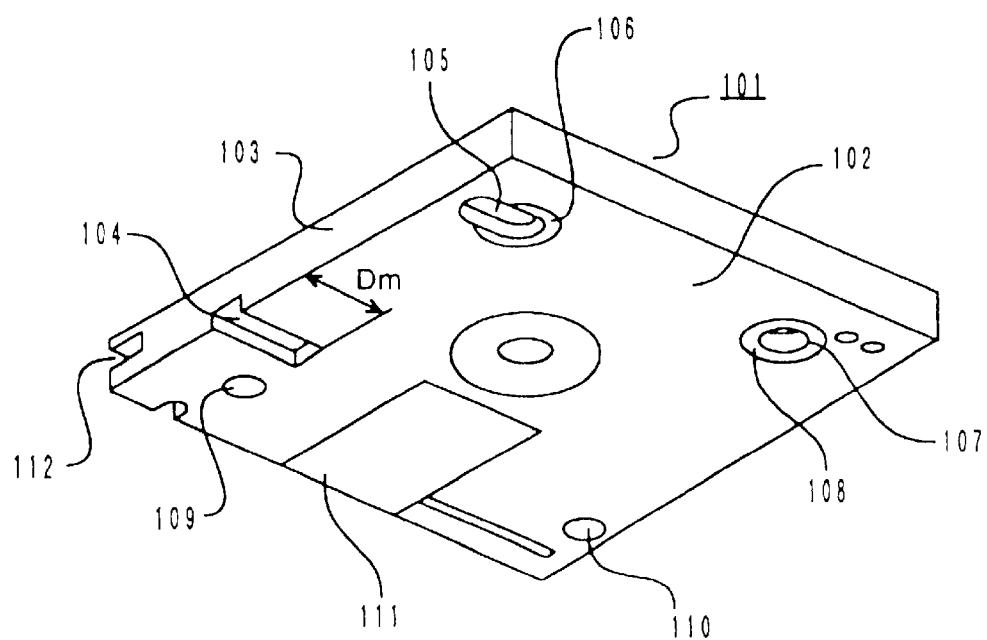
FIG. 16 is a perspective view of a first disk cartridge for use in a fourth embodiment.

FIG. 16 shows a first disk cartridge for use in the present embodiment. A cartridge body 101 has a bottom wall 102 which is formed with an erroneous insertion preventing groove 104 extending from a front end face 103 along the direction of insertion of the cartridge and having a length Dm. Indicated at 105 is a first positioning recessed portion formed in the bottom wall 102 of the body 101 and surrounded by an approximately circular first positioning reference face 106. Indicated at 107 is a second positioning recessed portion, around which a circular second positioning reference face 108 is also formed. Indicated at 109, 110 are third and fourth positioning reference faces, respectively.

The position of the disk cartridge to be loaded is determined relative to the disk player mechanism by these second and third positioning recessed portions 105, 107. The level at which the cartridge is to be loaded is determined by the first to fourth positioning reference faces 106, 108, 109, 110. Indicated at 111 is a shutter, and at 112 an unlocking piece inserting groove, these being similarly to the shutter 3 and the inserting groove 24 in the first to third embodiments in construction.

Figure 17:
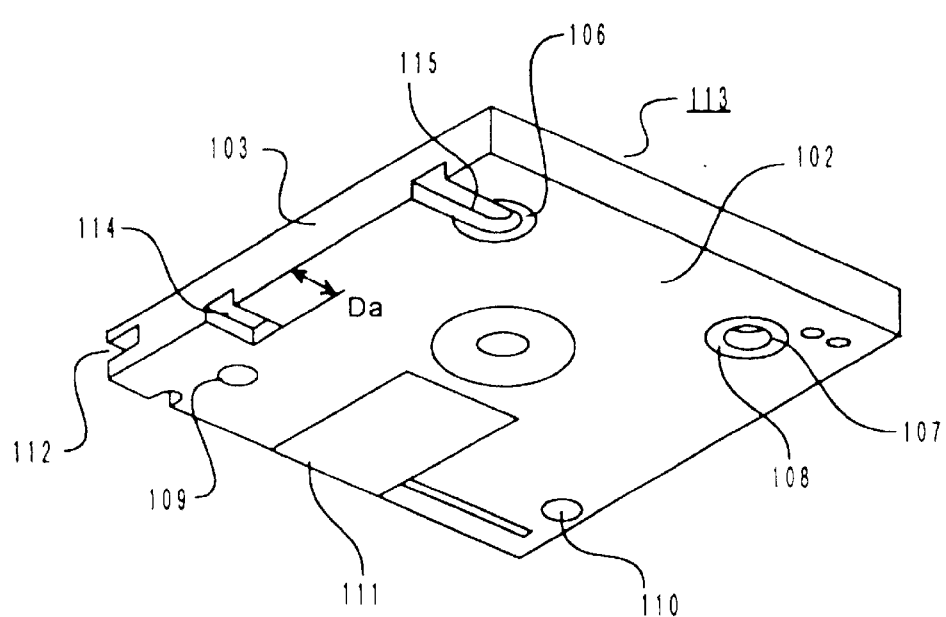
FIG. 17 is a perspective view of a second disk cartridge for use in the fourth embodiment.

FIG. 17 shows a second disk cartridge 113 constructed with the first disk cartridge 101 of FIG. 16 serving as a premise. In FIGS. 16 and 17, like parts are designated by like reference numerals and will not be described repeatedly. The second disk cartridge 113 is formed with an erroneous insertion preventing groove 114 having a length Da from the front end face 103. The second cartridge 113 has a first positioning recessed portion 115 having one end extending to the front end face 103. Although a detailed description will be given later, the recessed portion 115 therefore has the same function as the cartridge identification groove 72 of the second cartridge 7 of the third embodiment shown in FIG. 11. With the exception of the feature described above, the second cartridge is the same as the first disk cartridge 101 of FIG. 16.

According to the present embodiment as in the case of the third embodiment described, the relationship between the disk player and the disk cartridge must fulfill the following requirements.

(1) The first disk cartridge can be inserted into a first disk player, but the second disk cartridge is not insertable thereinto.

(2) The second disk cartridge can be inserted into a second disk player, but the first disk cartridge is not insertable thereinto.

(3) Both the first and second disk cartridges can be inserted into a common disk player.

Figure 18:
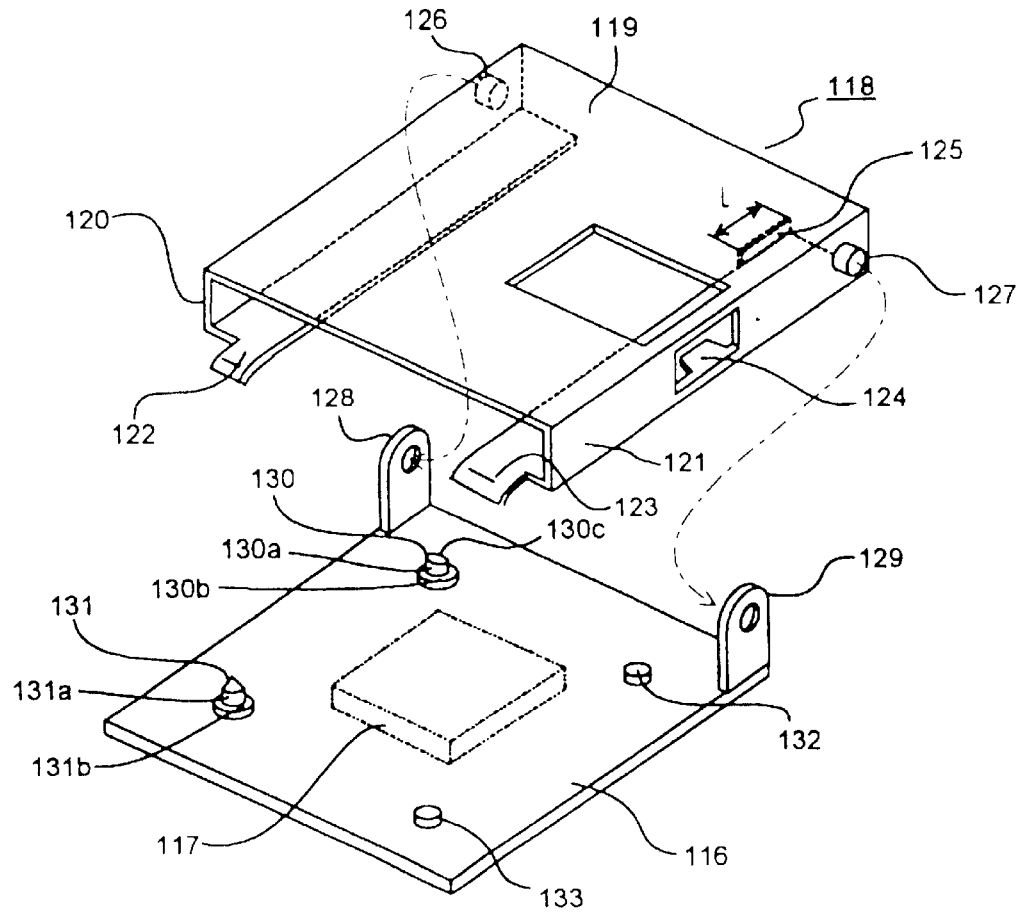
FIG. 18 is an exploded perspective view of a first disk player for use in the fourth embodiment.

FIG. 18 is a drawing showing a first disk player according to this embodiment. The first disk player comprises a base chassis 116 provided with a recording-playback unit 117 comprising a pickup and spindle motor, and a cartridge holder 118 pivoted to the base chassis 116. Thus the player has a mechanism of the so-called kangaroo pocket type.

The cartridge holder 118 has a left side wall 120 and right side wall 121 at opposite ends of a top wall 119. Projecting inward in parallel to the top wall 119 are a left bottom wall 122 at the lower end of the left side wall 120 and a right bottom wall 123 at the lower end of the right side wall 121. Thus, the disk cartridge 101 can be accommodated and held in the holder. The right side wall 121 has an unlocking piece 124 projecting inward therefrom. The right bottom wall 123 further has an erroneous insertion preventing piece 125 having a length L for preventing erroneous insertion of the cartridge. The length L of the piece 125 is smaller than the length Dm of the preventing groove 104 of the first disk cartridge 101 and greater than the length Da of the preventing groove 114 of the second disk cartridge 113. Pivots 126, 127 are implanted in the left side wall 120 and the right side wall 121, respectively, for supporting bearing portions 128, 129 of the base chassis 116.

On the other hand, the base chassis 116 is provided with four projections 130, 131, 132, 133 for determining the position and level of the disk cartridge as loaded in place. The first projection 130 and the second projection 131 respectively comprise pins 130a, 131a fittable in the first and second positioning recessed portions 105, 107 of the first disk cartridge 101 for positioning, and flanges 130b, 131b to be contacted with the first and second positioning reference faces 106, 108 for determining the level of the cartridge 101 to be loaded. Further the third projection 132 and the fourth projection 133 are adapted to come into contact with the respective third and fourth positioning reference faces 109, 110 of the disk cartridge 101 for determining the level of the cartridge 101 to be loaded.

Figure 19:
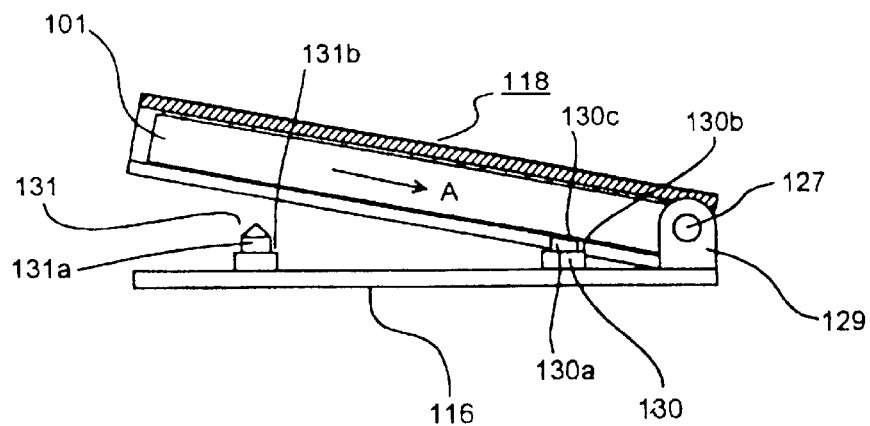
FIG. 19 is a side elevation partly broken away of the first disk player for use in the fourth embodiment.

FIG. 19 is a view in section showing the disk cartridge as loaded in the first disk player. As illustrated, the top end of the pin 130a of the first projection 130 provides a slope 130c having a height decreasing toward the direction of insertion of the cartridge (arrow A). Accordingly, the pin will interfere with neither of the first and second disk cartridges as they are inserted into the holder 118. Furthermore, the preventing piece 125 has a length L smaller than the length Dm of the preventing groove 104 of the first disk cartridge 101 as described above and therefore will not interfere with the insertion of the first cartridge 101. However, if it is attempted to load the second cartridge 113 into the first disk player, the cartridge 113 to be inserted is blocked since the length L of the preventing piece 125 is greater than the preventing groove 114 of the second cartridge 113. Thus, the foregoing requirement (1) is fulfilled.

Figure 20:
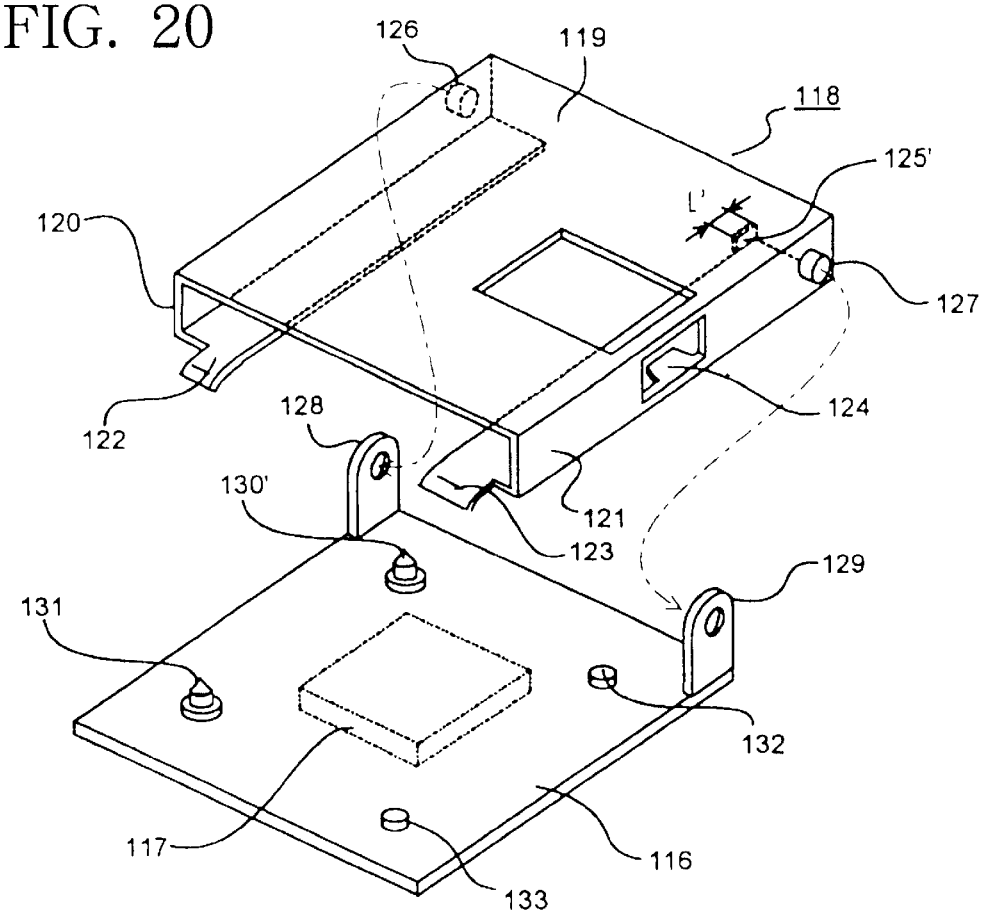
FIG. 20 is an exploded perspective view of a second disk player for use in the fourth embodiment.
Figure 21:
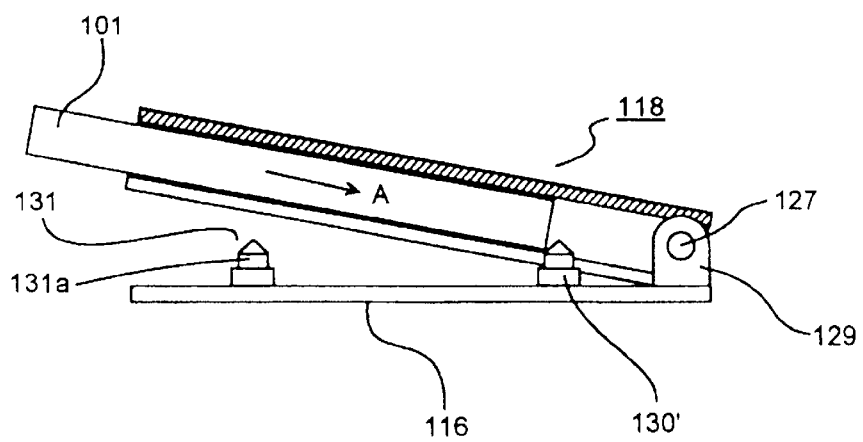
FIG. 21 is a side elevation partly broken away of the second disk player for use in the fourth embodiment.
Figure 22:
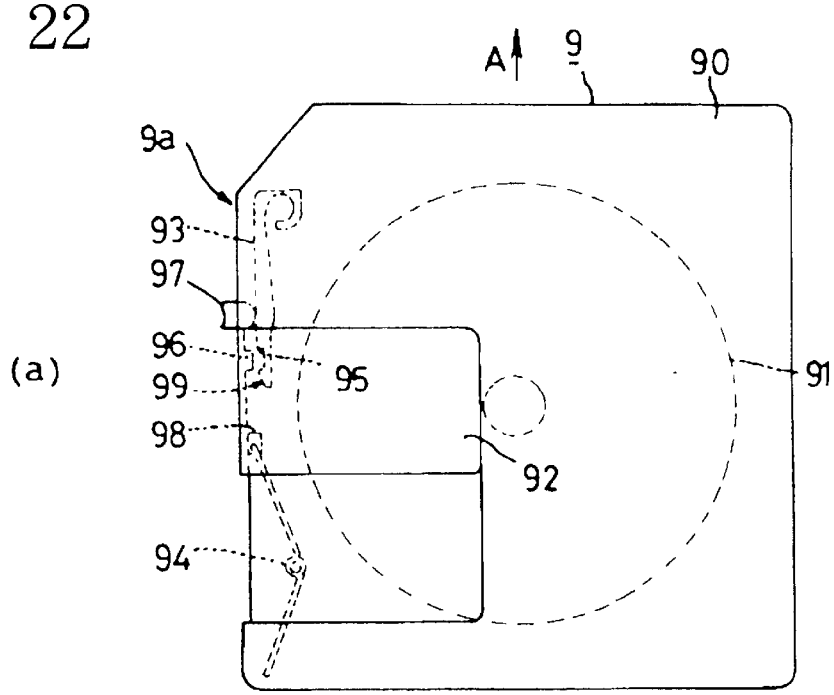
FIG. 22 includes plan views showing the construction and operation of a conventional disk cartridge.
Figure 22:
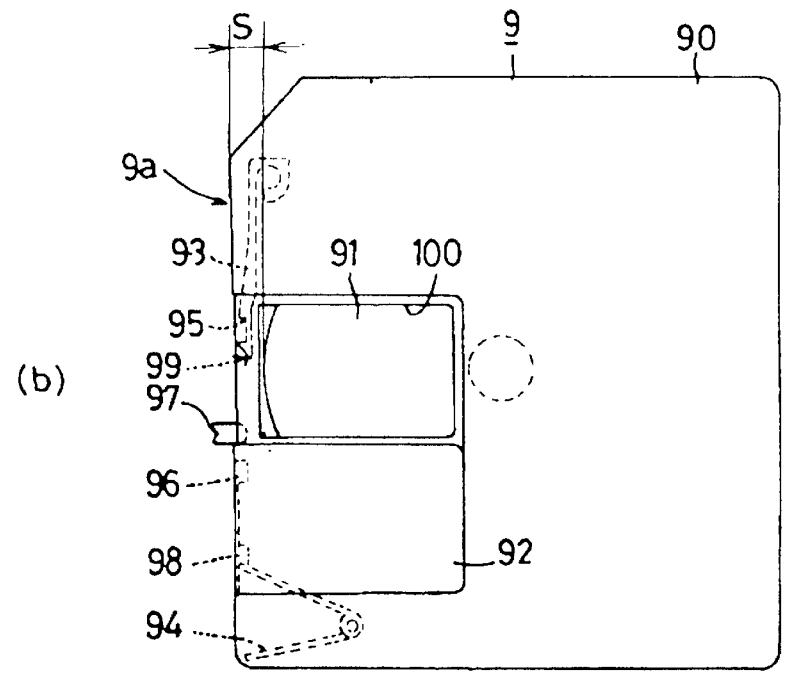

FIG. 20 is a view showing the second disk player of the present embodiment. The second player has an erroneous insertion preventing piece 125' with a length L' which is smaller than the length Da of the preventing groove 114 of the second disk cartridge 113. A first projection 130' is identical with a second projection 131 in shape and has no slope at its top end. Accordingly, if it is attempted to load the first cartridge 101 into the second disk player, the front end of the cartridge comes into contact with the first projection 130', which prevents the insertion of the cartridge into the holder 118 as shown in FIG. 21. On the other hand, the second cartridge 113 can be loaded into the player without coming into contact with the first projection 130' because the first positioning recessed portion 115 has one end extending to the front end face 103. Thus, the foregoing requirement (2) is fulfilled.

A third disk player into which both the first cartridge 101 and the second cartridge 113 are loadable can be realized by making the length L of the preventing piece 125 of the first disk player of FIG. 18 shorter than the length Da of the preventing groove 114 of the second disk cartridge 113, and providing a pin 130a of first projection 130 which is given at its top end a slope 130c lowering toward the cartridge insertion direction (arrow A) as in the first disk player of FIG. 18. Thus the foregoing requirement (3) is fulfilled. In the third disk player, the disk cartridge loaded may be identified, for example, by detecting the difference between the disks in signal recording format.

For use with two cartridges of different standards, i.e., the first and second disk cartridges, which are identical in external dimensions but different in recording-reproduction system, the present embodiment makes it possible to realize a first disk player usable only for the first cartridge for recording or playback, a second disk player usable only for the second cartridge for recording or playback, and a common disk player usable for both the cartridges for recording or playback, by giving very simple structural differences to these players.

What is claimed is:

1. A disk player for use with both a first disk cartridge (2) and a second disk cartridge (7) different from the disk cartridge (2) in signal recording system to record and/or reproduce signals, the disk player being characterized in that each of the disk cartridges (2), (7) comprises a flat rectangular parallelepipedal cartridge body (20, 70) enclosing a disk therein, the cartridge bodies (20), (70) being identical in external dimensions, the cartridge body (20) of the first disk cartridge (2) having an erroneous insertion preventing groove (25) formed in a front end face (2a) thereof orthogonal to the direction A of insertion into a disk player and having a predetermined depth along the insertion direction, the cartridge body (70) of the second disk cartridge (7) having an erroneous insertion preventing groove (71) opened at the same position as the preventing groove (25) of the first disk cartridge (2) and smaller than the preventing groove (25) in depth along the cartridge insertion direction A, and a cartridge identification groove (72) of predetermined depth not existing in the cartridge body (20) of the first disk cartridge (2), the disk player comprising a cartridge holder (85) for the disk cartridge to be inserted in, the cartridge holder (85) having a lug (81) projecting from a side wall (48) thereof and positioned in corresponding relation with the depth of the preventing groove (71) of the second disk cartridge (7) to advance into the groove (71), the cartridge holder (85) having a bottom wall (40) free from any obstacle against the insertion of both the disk cartridges (2), (7).

2. A disk player according to claim 1 wherein the cartridge holder (85) has an on-off switch (86) provided on the bottom wall (40) and positionable in the cartridge identification groove (72) formed in the body (70) of the second disk cartridge (7), and the disk cartridge accommodated in the cartridge holder (85) can be identified from the on or off state of the switch (86).

* * * * *